US008689045B2

(12) United States Patent
Morris et al.

(10) Patent No.: US 8,689,045 B2
(45) Date of Patent: Apr. 1, 2014

(54) APPARATUS AND METHOD FOR RELOADING SOFTWARE IMAGES

(75) Inventors: Julie Anne Morris, Raleigh, NC (US); Joshua Neil Novak, Wake Forest, NC (US); Michael Terrell Vanover, Raleigh, NC (US); Wen Zezhong, Beijing (CN)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 145 days.

(21) Appl. No.: 12/615,881

(22) Filed: Nov. 10, 2009

(65) Prior Publication Data
US 2011/0113283 A1      May 12, 2011

(51) Int. Cl.
*G06F 11/00* (2006.01)
(52) U.S. Cl.
USPC ............................................. 714/15; 714/38.1
(58) Field of Classification Search
USPC ................. 714/15, 38.1; 726/22–25
See application file for complete search history.

(56) References Cited

U.S. PATENT DOCUMENTS

| 6,009,401 | A  | * | 12/1999 | Horstmann ..................... 705/317 |
| 6,363,499 | B1 | * | 3/2002  | Delo et al. ....................... 714/15 |
| 6,640,317 | B1 | * | 10/2003 | Snow ............................ 714/38.1 |
| 6,934,881 | B2 | * | 8/2005  | Gold et al. ....................... 714/15 |
| 7,389,442 | B1 | * | 6/2008  | Lee .................................. 714/2 |
| 7,499,958 | B1 | * | 3/2009  | Ionescu ................................. 1/1 |
| 2002/0078338 | A1 |   | 6/2002  | Lay et al. |
| 2002/0087914 | A1 | * | 7/2002  | Sarra et al. ....................... 714/15 |
| 2004/0107199 | A1 | * | 6/2004  | Dalrymple et al. ........... 707/100 |
| 2006/0041572 | A1 | * | 2/2006  | Maruyama .................... 707/101 |
| 2011/0078497 | A1 | * | 3/2011  | Lyne et al. ....................... 714/15 |

FOREIGN PATENT DOCUMENTS

| CN | 1700341 | 11/2005 |
| CN | 101131651 | 2/2008 |
| WO | 2009087028 A1 | 7/2009 |

OTHER PUBLICATIONS 201010503180.7 Chinese Office Action, Jul. 25, 2012.

* cited by examiner

*Primary Examiner* — Philip Guyton
(74) *Attorney, Agent, or Firm* — Kunzler Law Group (57) ABSTRACT

An apparatus and method are disclosed for reloading software images. A copy module copies application metadata for an application image to an application metadata copy. The application metadata and application image are stored on a writable memory of a data processing device. The application metadata copy is stored remotely from the data processing device. A detection module detects an operational anomaly. An erasure module erases at least the application image on the writeable memory in response to detecting the operational anomaly. An identification module identifies the application image from the application metadata copy. A reload module reloads the application image to the writable memory using the application metadata copy.

9 Claims, 9 Drawing Sheets

APPARATUS AND METHOD FOR RELOADING SOFTWARE IMAGES

BACKGROUND

1. Field

The subject matter disclosed herein relates to software images and more particularly relates to reloading software images.

2. Description of the Related Art

Data processing devices use application programs to perform functions and operations for user. The application program is typically loaded as an application image to a memory data processing device and executed. Unfortunately, the memory space of the data processing device may become corrupted. As a result, the application image may need to be recovered. Unfortunately, determining how to restore the application image may be a time consuming and expensive process.

SUMMARY

From the foregoing discussion, there is a need for an apparatus and method that reloads software images. Beneficially, such an apparatus and method would reload application images to a data processing device.

The embodiments of the present invention have been developed in response to the present state of the art, and in particular, in response to the problems and needs in the art that have not yet been fully solved by currently available software image reloading methods. Accordingly, the embodiments have been developed to provide an apparatus and method that overcome many or all of the above-discussed shortcomings in the art.

An apparatus for reloading software images is provided with a plurality of modules. The modules include a copy module, a detection module, an erasure module, an identification module, and a reload module.

The copy module copies application metadata for an application image to an application metadata copy. The application metadata and application image are stored on a writable memory of a data processing device. The application metadata copy is stored remotely from the data processing device.

The detection module detects an operational anomaly. The erasure module erases at least the application image on the writeable memory in response to detecting the operational anomaly. The identification module identifies the application image from the application metadata copy. The reload module reloads the application image to the writable memory using the application metadata copy.

A method is presented for reloading software images. In one embodiment, the method includes the steps to carry out the functions of the apparatus.

A copy module copies application metadata for an application image to an application metadata copy. The application metadata and application image are stored on a writable memory of a data processing device. The application metadata copy is stored remotely from the data processing device.

A detection module detects an operational anomaly. An erasure module erases at least the application image on the writeable memory in response to detecting the operational anomaly. An identification module identifies the application image from the application metadata copy. A reload module reloads the application image to the writable memory using the application metadata copy.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising a computer readable program stored on a tangible memory device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1:
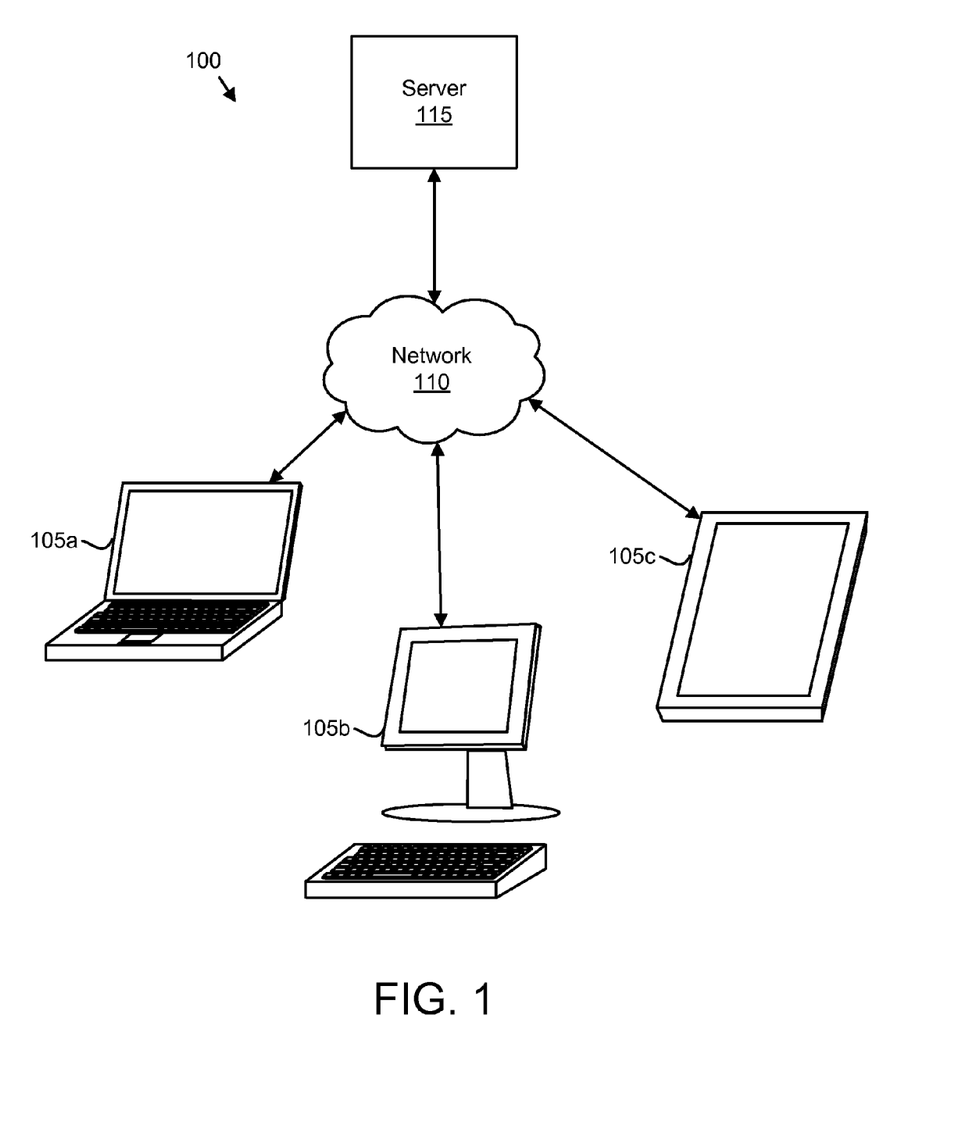
FIG. 1 is a diagram illustrating one embodiment of a computing system.

FIG. 1 is a diagram illustrating one embodiment of a computing system 100. The computing system 100 includes a server 115, a network 110, and one or more data processing devices 105. The data processing devices 105 include a laptop computer 105a, a thin client computer 105b, and a tablet computer 105c. One of skill in the art will recognize that embodiments may be practiced with other data processing devices 105.

The data processing devices 105 communicate with the network 110. The network 110 may be the Internet, a Wide Area Network (WAN), a Local Area Network (LAN), or the like. Connections to the network 110 may be implemented as Ethernet connections, token ring connections, Wi-Fi connections, Bluetooth® connections, cellular telephone connections, or the like.

The server 105 may also communicate with the network 110. The data processing devices 105 may communicate with the server 115 through the network 110. In one embodiment, a data processing device 105 downloads an application image from the server 115. In a certain embodiment, the data processing device 105 downloads all application images from the server 115.

The application image may be purchased, rented, leased, or licensed. A data processing device 105 may execute the application image. In one embodiment, an application image may be used across a plurality of data processing devices 105.

Figure 2:
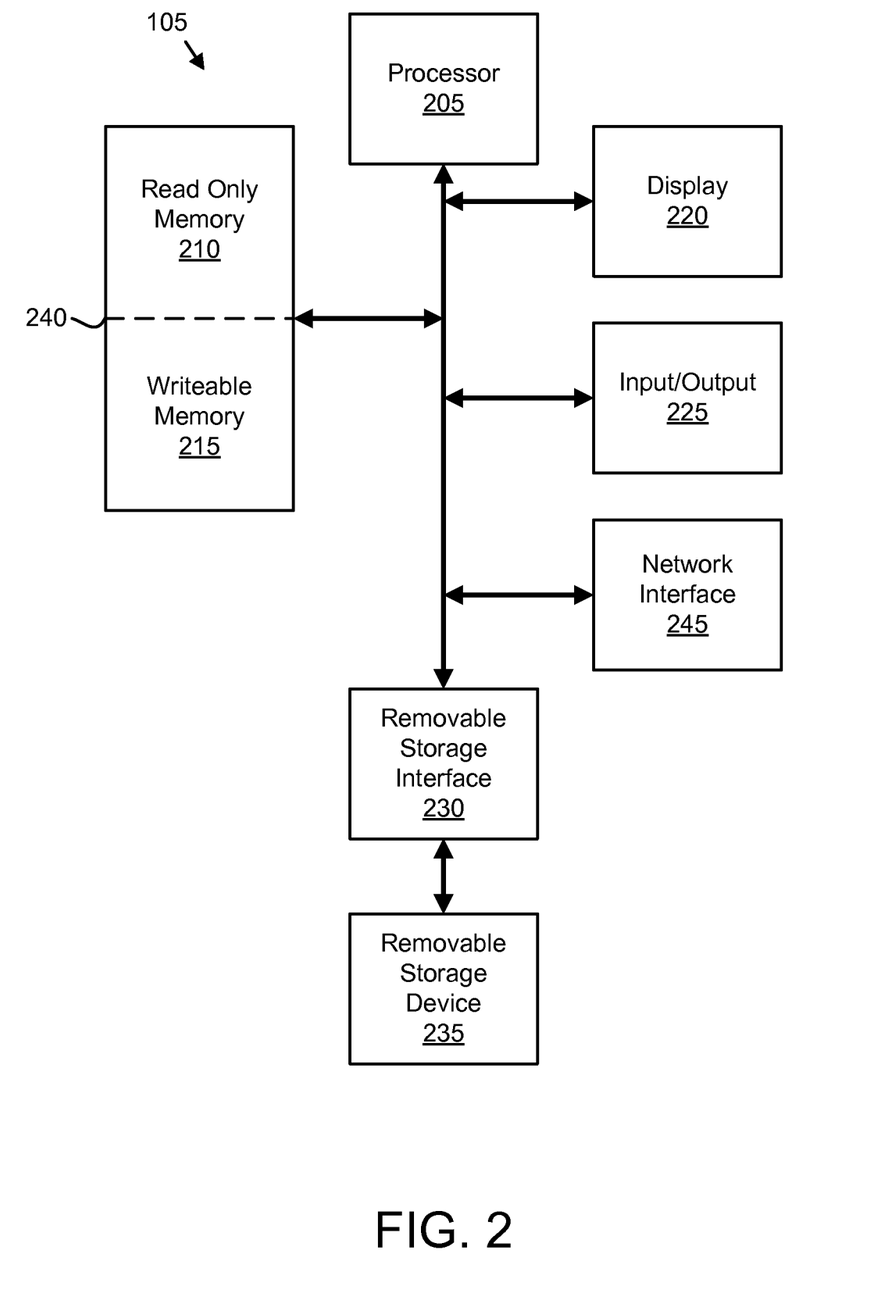
FIG. 2 is a schematic block diagram illustrating one embodiment of a data processing device.

FIG. 2 is a schematic block diagram illustrating one embodiment of a data processing device 105. The data processing device 105 may be the data processing device 105 FIG. 1. The description of the data processing device 105 refers to elements of FIG. 1, like numbers referring to like elements. The data processing device 105 includes a processor 205, a memory device 240, a display 220, an input/output 225, a network interface 245, a removable storage interface 230, and a removable storage device 235.

The processor 205, memory device 240, display 220, input/output 225, network interface 245, removable storage interface 230, and removable storage device 235, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory device 240 is a tangible device. In one embodiment, the memory device 240 is a Flash memory. Alternatively, the memory device 240 may be Dynamic Random Access Memory (DRAM), a micromechanical memory, an optical memory, a holographic memory, a semiconductor memory, or the like. In the depicted embodiment, the memory device 240 includes a read-only memory 210 and a writable memory 215. In an alternate embodiment, the memory device 240 includes only the writable memory 215.

The memory device 240 stores computer readable programs. The processor 205 executes the computer readable programs as is well known to those skilled in the art. In one embodiment, the read-only memory 210 is programmed by a manufacturer of the data processing device 105 and is not subsequently modified. The read-only memory 210 may store the computer readable programs executed by the processor 205 to perform functions that will be described hereafter. The writable memory 215 may store application images of application programs executed by the processor 205 for a user. The application programs may include a web browser, an e-mail client, a word processor, and the like.

The display 220 displays graphics and data to the user. The display 220 may include a graphics processor and a display device such as a Liquid Crystal Display (LCD), an electronic ink display, a touchscreen, or the like. The input/output 225 may receive text and pointing commands from the user and communicate audio information to the user. The network interface 245 may interface to the network 110.

The removable storage interface 230 interfaces between the data processing device 105 and a removable storage device 235. The removable storage interface 230 may be a Universal Serial Bus (USB) interface, a Secure Digital (SD) interface, a Peripheral Component Interconnect (PCI) interface, or the like. The removable storage device 235 may be a USB Flash drive, an SD card, a portable hard disk drive, or the like.

Figure 3:
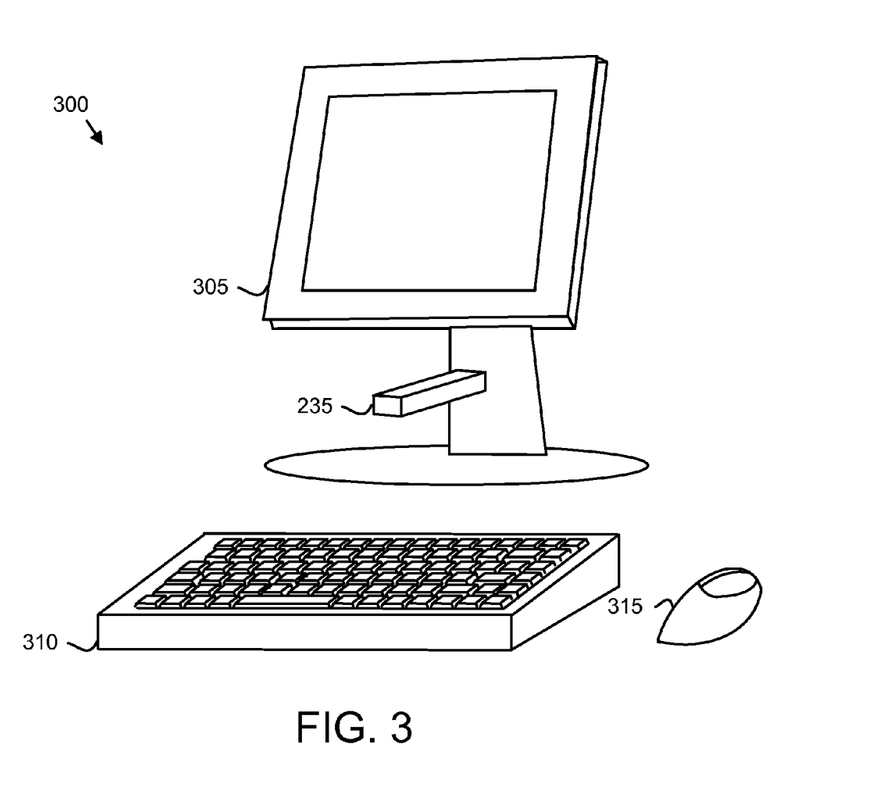
FIG. 3 is a perspective drawing illustrating one embodiment of a data processing device and removable storage device system.

FIG. 3 is a perspective drawing illustrating one embodiment of a data processing device and removable storage device system 300. The system 300 may be the thin client computer 105b of FIG. 1. The description of the system 300 refers to elements of FIGS. 1-2, like numbers referring to like elements. The system 300 includes a monitor 305, a keyboard 310, a mouse 315, and the removable storage device 235.

The monitor 305 may be embodied in the display 220 of FIG. 2. The keyboard 310 and the mouse 315 may be embodied in the input/output 225 of FIG. 2. The monitor 305 may also house the processor 205, the memory device 240, the network interface 245, and the removable storage interface 230.

In one embodiment, the user stores all user data on the removable storage device 235. For example, the user may store documents, images, e-mail, audio files, databases, and the like on the removable storage device 235. The user may employ the system 300 to create and manipulate the user data. In addition, the user may remove the removable storage device 235 from the system 300 and carry the removable storage device 235 to another data processing device 105. Thus the user may be able to access and manipulate the user data on a plurality of data processing devices 105.

In one embodiment, the system 300 stores the application images of application programs commonly required by the user in the writable memory 215. The system 300 may also download application images of application programs from the server 115 as needed.

Figure 4:
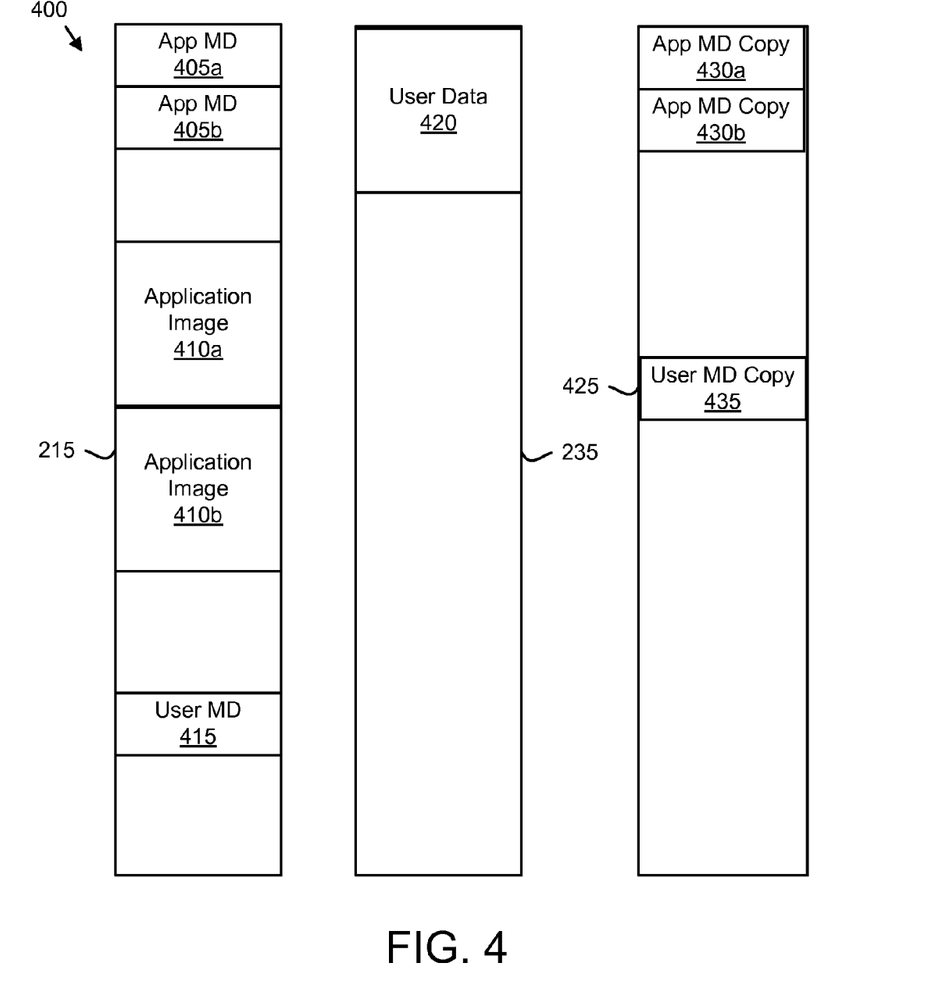
FIG. 4 is a schematic block diagram illustrating one embodiment of memory spaces.

FIG. 4 is a schematic block diagram illustrating one embodiment of memory spaces 400. The memory spaces 400 represent data stored in the writable memory 215, the removable storage device 235, and a server memory space 425 that is accessed by the server 115. The description of the memory spaces 400 refers to elements of FIGS. 1-3, like numbers referring to like elements.

The server memory space 425 may be on a hard disk drive of the server 115. Alternatively, the server memory space 425 may be on a semiconductor memory of the server 115. In a certain embodiment, the server memory space 425 may be on a discrete storage device accessible by the server 115, such as an external optical storage device.

The writable memory 215 stores one or more application images 410. In addition, the writable memory 215 stores application metadata 405 for each application image 410. The application metadata 405 may store a name of an application image 410, a version number, a time stamp indicating when the application image 410 was loaded to the writable memory 215, and the like. In one embodiment, the application metadata 405 stores a source of the application image 410. The application metadata 405 may be created by indexing the application images 410.

In one embodiment, the application metadata 405 includes information related to licensing, renting, leasing, and/or purchasing the application image 410. For example, the data processing device 105 may rent the application image 410 and along with the application image 410 may download a rental token such as a confirmation code, an access key, a serial number, or the like. The application metadata 405 may include the rental token, a purchase token, or the like.

In one embodiment, the writable memory 215 also stores user metadata. The user metadata 415 may index the user data 420 stored on the removable storage device 235. In one embodiment, the application metadata 405 is copied from the writable memory 215 to the server memory space 425 as application metadata copies 430 as will be described hereafter. In addition, the user metadata 415 may be copied from the removable storage device 235 to the server memory space 425 as user metadata copies 435.

Figure 5:
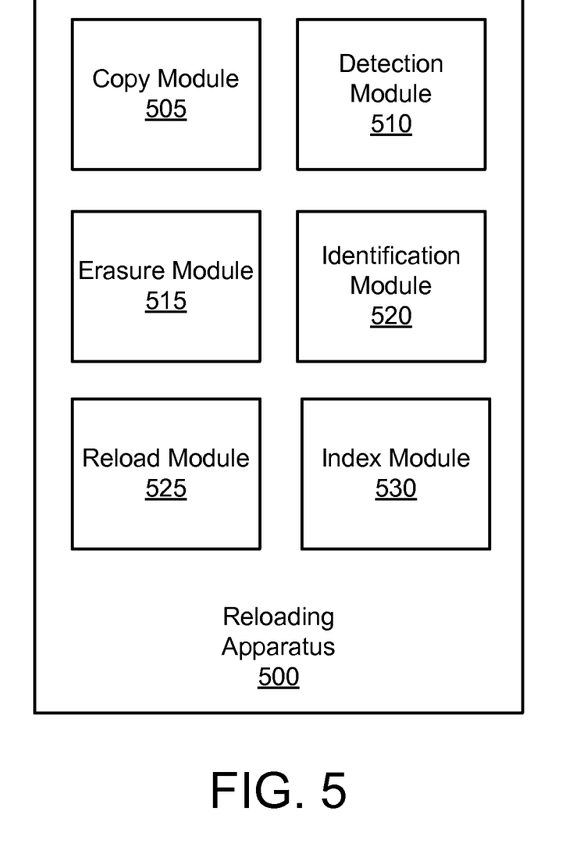
FIG. 5 is a schematic block diagram illustrating one embodiment of a reloading apparatus.

FIG. 5 is a schematic block diagram illustrating one embodiment of a reloading apparatus 500. The reloading apparatus 500 may be embodied in a data processing device 105 of FIG. 1, the server 115 of FIG. 1, or a combination thereof. The description of the reloading apparatus 500 refers to elements of FIGS. 1-4, like numbers referring to like elements. The reloading apparatus includes a copy module 505, a detection module 510, an erasure module 515, an identification module 520, a reload module 525, and an index module 530.

In one embodiment, the copy module 505, detection module 510, erasure module 515, identification module 520, reload module 525, and index module 530 are embodied in a computer readable storage medium. The computer readable storage medium may comprise a computer readable program stored on a tangible memory device such as the memory device 240 of FIG. 2. The processor 205 may execute the computer readable program to perform the functions of the copy module 505, detection module 510, erasure module 515, identification module 520, reload module 525, and index module 530.

In one embodiment, the index module 530 stores the application image 410 on the writable memory 215. In addition, the index module 530 may index the application image 410 by creating the application metadata 405. The index module 530 may incorporate one or more elements of an operating system.

The copy module 505 copies the application metadata 405 for the application image 410 to the application metadata copy 430. The application metadata 405 and application image 410 are stored on the writable memory 215 of a data processing device 105. The application metadata copy 430 is stored remotely from the data processing device 105. In one embodiment, the application metadata copy 430 is stored by the server 115, such as in the server memory space 425. In one embodiment, the application image 410 is not copied from the data processing device the 105.

The detection module 510 detects an operational anomaly. In one embodiment, the detection module 510 detects a computer virus operational anomaly. The erasure module 515 erases at least the application image 410 on the writeable memory 215 in response to detecting the operational anomaly. In one embodiment, the erasure module 515 erases an entry in an address table for the application image 410 to erase the application image 410.

The identification module 520 identifies the application image 410 from the application metadata copy 430. In one embodiment, the application metadata copy 430 identifies a Universal Resource Locator (URL) for the application image 410. The reload module 525 reloads the application image 410 to the writable memory 215 using the application metadata copy 430.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
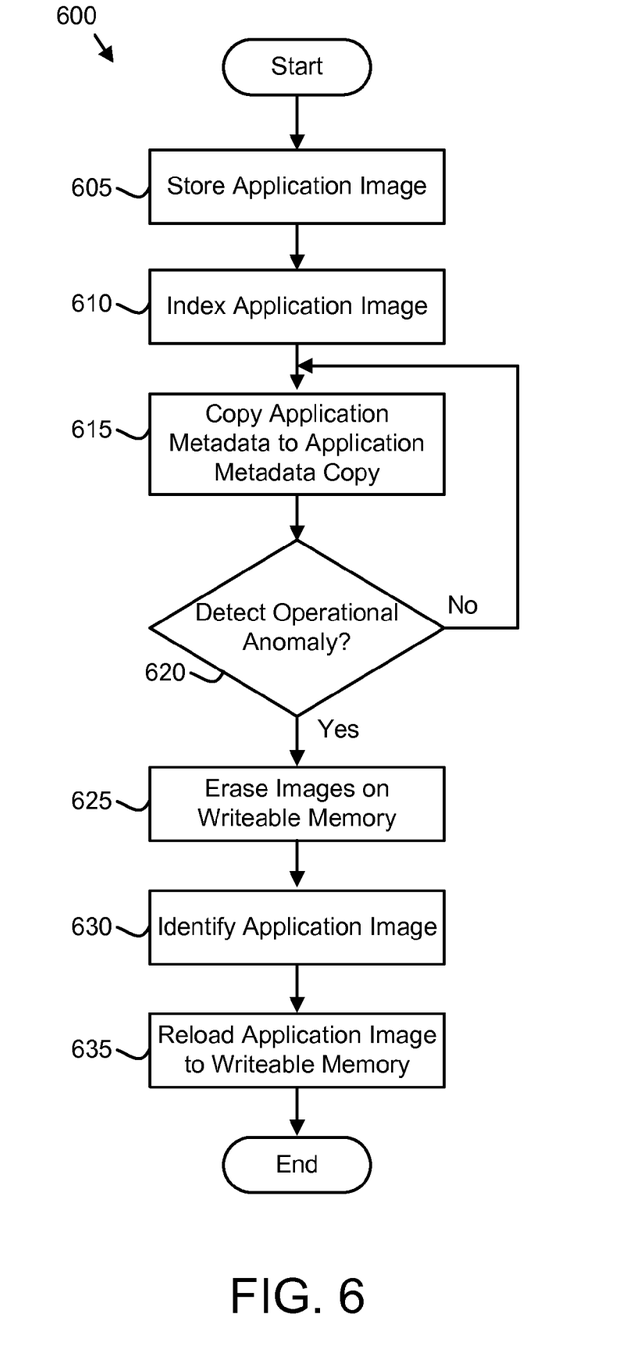
FIG. 6 is a schematic flow chart diagram illustrating one embodiment of a reloading method.

FIG. 6 is a schematic flow chart diagram illustrating one embodiment of a reloading method. 600. The method 600 substantially includes the steps to carry out the functions presented above with respect to the operation of the described apparatus and system of FIGS. 1-5. The description of the method 600 refers to elements of FIGS. 1-5, like numbers referring to like elements. In one embodiment, the method 600 is implemented with a computer readable storage medium comprising a computer readable program stored on a tangible memory device such as the memory device 240 of FIG. 2. The computer readable storage medium may be integrated into a computing system, such as the data processing device 105, wherein the computer readable program executed by the computing system performs the method 600.

The method 600 starts, and in one embodiment, the index module 530 stores 605 the application image 410 on the writable memory 215. The index module 530 may download the application image 410 from the server 115 over the network 110. In a certain embodiment, application images 410 are exclusively downloaded over the network 110. The server 115 may maintain a repository of the application images 410 for all application programs available on the data processing device 105. Alternatively, the index module 530 may download the application images 410 from a plurality of URLs.

The index module 530 may permanently maintain some application images 410 in the writable memory 215. In addition, the index module 530 may temporarily download other application images 410 to the writable memory 215 as required by the user.

The index module 530 may index 610 the application image 410 by creating the application metadata 405. The index module 530 may store the application metadata 405 in the writable memory 215. The index module 530 may index 610 the application image 410 as part of an operating system function.

The copy module 505 copies 615 the application metadata 405 for the application image 410 to the application metadata copy 430. The application metadata 405 and application image 410 are stored on the writable memory 215 of a data processing device 105. The application metadata copy 430 is stored 615 remotely from the data processing device 105. In one embodiment, the application metadata copy 430 is stored by the server 115, such as in the server memory space 425.

In one embodiment, the copy module 505 copies 615 the application metadata 405 to the application metadata copy 430 each time the application metadata 405 is modified. Alternatively, the copy module 505 may copy 615 the application metadata 405 to the application metadata copy 430 in response to a predetermined event, such as the data processing device 105 connecting to the network 110, a specified time, or the like. Copying the application image 410 may not be required as the application metadata copy 430 may contain all the information required to reload the application image 410 to the writable memory 215.

The detection module 510 detects 620 an operational anomaly. In one embodiment, the operational anomaly is a computer virus. The computer virus may be executing on a processor 205. Alternatively, the computer virus may be resident in the writable memory 215. In one embodiment, the detection module 510 scans the writable memory 215 and compares the contents of the writable memory 215 to elements of known computer viruses to detect the computer virus.

In a certain embodiment, the operational anomaly is detected 620 when there is a failure of an application image 410. For example, if the data processing device 105 is unable to execute an application program from an application image 410, the detection module 510 may detects 620 the operational anomaly.

The operational anomaly may be detected 620 if the checksum for application image 410 is not equal to an expected value. For example, the application image 410 may include a checksum, such as Cyclical Redundancy Check (CRC) value, when the application image 410 is downloaded to the writable memory 215. The detection module 510 may subsequently recalculate the checksum for the application image 410. If the recalculated checksum is not equal to the original downloaded checksum, the detection module 510 may detect 620 the operational anomaly.

If the detection module 510 does not detect 620 the operational anomaly, the copy module 505 may continue to copy 615 the application metadata 405 to the application metadata copy 430. If the detection module 510 detects 620 the operational anomaly, the erasure module 515 erases at least the application image 410 on the writeable memory 215 in response to detecting the operational anomaly.

Figure 8:
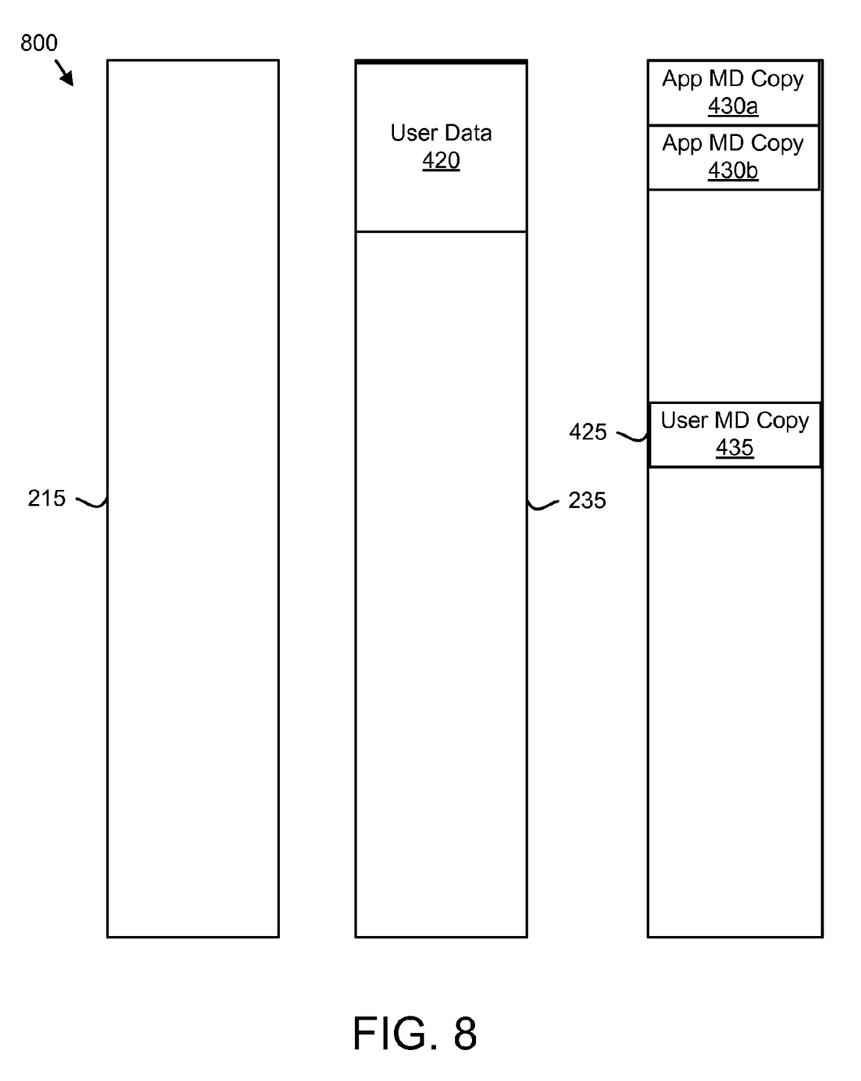
FIG. 8 is a schematic block diagram illustrating one embodiment of an erased memory space.

In one embodiment, the erasure module 515 erases 625 all images on the writable memory 215 including the application metadata 405, the application images 410, and the user metadata 415, as will be illustrated hereafter in FIG. 8. Because all application images 410 and metadata 405, 415 are erased, there is no chance that a computer virus or other anomaly remains stored in the writable memory 215.

Alternatively, the erasure module 515 may erase only a corrupted application image 410 of a plurality of application images 410. In addition, the erasure module 515 may erase the application metadata 405 associated with the corrupted application image 410.

The identification module 520 identifies 630 the application image 410 from the application metadata copy 430. In one embodiment, the identification module 520 parses the application name, version number, source information, URL, rental token, purchase token, and the like from the application metadata copy 430 to identify 630 the application image 410.

The reload module 525 reloads 635 the application image 410 to the writable memory 215 using the application metadata copy 430 and the method 600 ends. For example, the reload module 525 may use the application name, the URL, and a rental token stored in the application metadata copy 430 to rent and download the application image 410 over the network 110 from a vendor to the writable memory 215. Alternatively, the reload module 525 may reload 635 the application image 410 identified 630 by the identification module 520 from the repository to the writable memory 215. For example, the server 115 may maintain an enterprise-wide repository of application images 410 and the reload module 525 may reload 635 the application image 410 from the repository.

By copying 615 the application metadata 405 to the application metadata copy 430, the method 600 may easily and efficiently identify the application images 410 stored in the writable memory 215 of the data processing device 105 by accessing the application metadata copy 430. As a result, the method 600 may efficiently reload 635 application images 410 to the writable memory 215. The method 600 supports automated management of the application images 410 on the data processing device 105.

Figure 7:
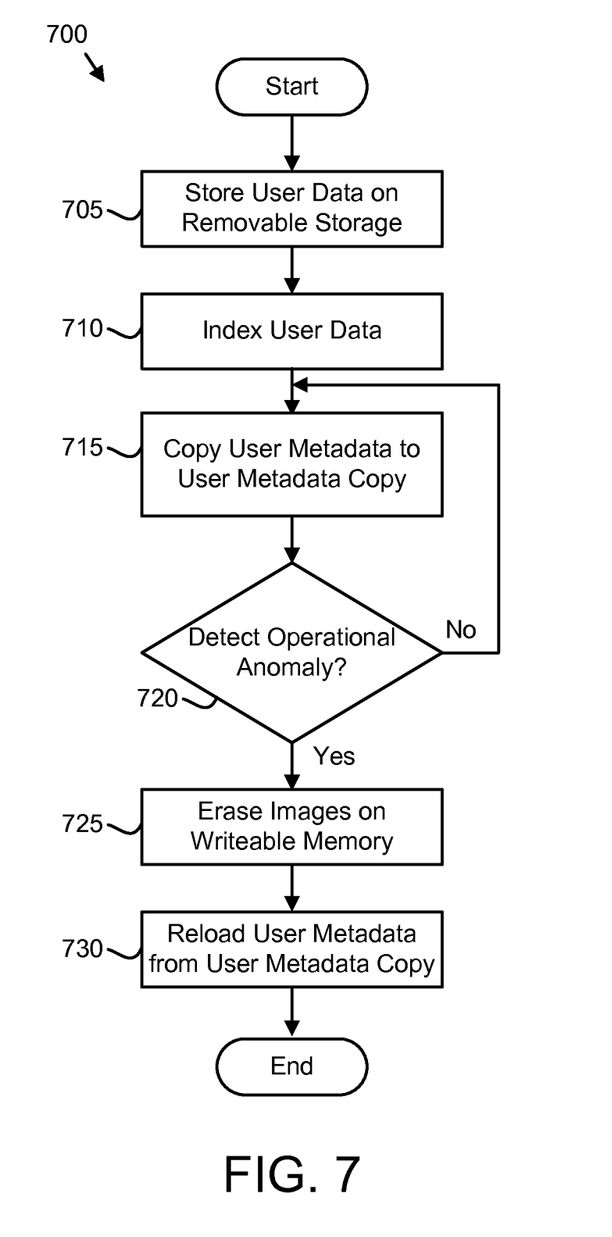
FIG. 7 is a schematic flow chart diagram illustrating one embodiment of a user metadata reloading method.

FIG. 7 is a schematic flow chart diagram illustrating one embodiment of a user metadata reloading method 700. The method 700 substantially includes the steps to carry out functions presented above with respect to the operation of the described apparatus and system of FIGS. 1-5. The description of the method 700 refers to elements of FIGS. 1-6, like numbers referring to like elements. In one embodiment, the method 700 is implemented with a computer readable storage medium comprising a computer readable program stored on a tangible memory device such as the memory device 240 of FIG. 2. The computer readable storage medium may be integrated into a computing system, such as the data processing device 105, wherein the computer readable program executed by the computing system performs the method 700.

The method 700 starts and in one embodiment, the index module 530 stores 705 the user data 420 on the removable storage device 235. The user data 420 may be created by the user on the data processing device 105 using an application program executed from an application image 410. Alternatively, the user data 420 may be downloaded from the network 110.

The index module 530 may create user metadata 415 stored on the writeable memory 215 by indexing 710 the user data 420. The index module 530 may index 710 the user data 420 as part of an operating system operation.

In one embodiment, the copy module 505 copies 715 the user metadata 415 from the writable memory 215 to the user metadata copy 435. The user metadata copy 435 may be stored remotely from the data processing device 105. In one embodiment, the user metadata copy 435 is stored in the server memory space 425.

In one embodiment, the 505 module 505 copies 715 the user metadata 415 to the user metadata copy 435 each time the user metadata 415 is modified. In an alternate embodiment, the copy module 505 copies 715 the user metadata 415 to the user metadata copy 435 in response to a predetermined event. The predetermined event may include the data processing device 105 connecting to the network 110, a specified time, or the like.

The detection module 510 may detect 720 an operational anomaly. In one embodiment, the operational anomaly is the operational anomaly of step 620 of FIG. 6. If the detection module 510 does not detect 720 the operational anomaly, the copy module 505 may continue to copy 715 the user metadata 415 to the user metadata copy 435.

If the detection module 510 detects 720 operational anomaly, the erasure module 515 may erase 725 images on the writable memory 215. In one embodiment, the erasure module 515 erases 725 all images on the writable memory 215. Alternatively, the erasure module 515 may erase 725 selected images on the writable memory 215 such as the application metadata 405, the application images 410, and/or the user data 415.

The reload module 525 reloads 730 the user metadata 415 to the writable memory 215 from the user metadata copy 435 and the method 700 ends. By reloading 730 the user metadata 415, the method 700 efficiently restores the user metadata 415 without re-indexing the user data 420 stored on the removable storage device 235.

FIG. 8 is a schematic block diagram illustrating one embodiment of an erased memory space 800. The description of the memory space 800 refers to elements of FIGS. 1-7, like numbers referring to like elements. The erased memory space 800 depicts the memory space 400 of FIG. 4 after the erasure module 515 has erased 625 all images including to application metadata 405, the application images 410, and the user metadata 415 in the writable memory 215.

Because no images reside in the writable memory 215, the writable memory is certain to be free of anomalies such as computer viruses, erroneously loaded application images 410, and the like. Thus an administrator including an automated administrator can quickly prepare the writable memory 215 to reload 635 the application images 410.

Figure 9:
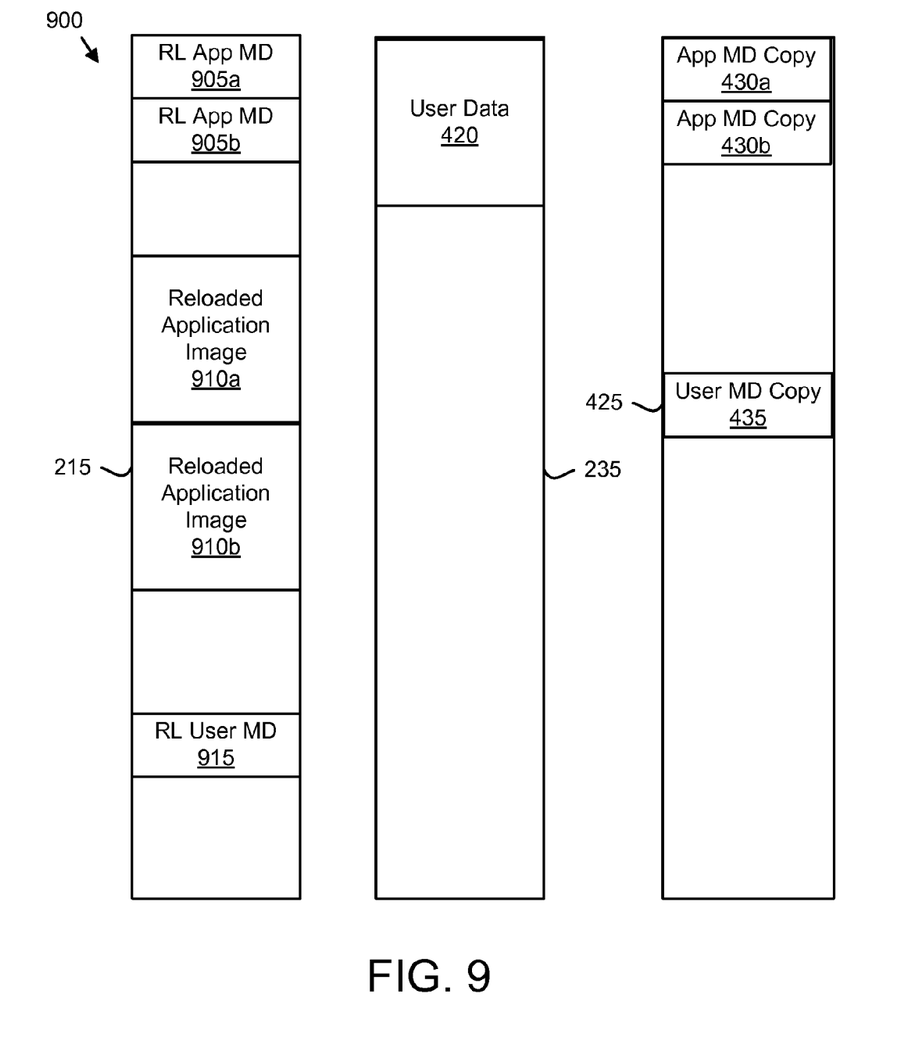
FIG. 9 is a schematic block diagram illustrating one embodiment of a reloaded application image.

FIG. 9 is a schematic block diagram illustrating one embodiment of a reloaded application image 900. The description of the reloaded application image 900 refers to elements of FIGS. 1-8, like numbers referring to like elements. The reloaded application image 900 depicts the erased memory space 800 of FIG. 8 after the reload module 525 reloads 635 the application images 410 to the writable memory 215 as reloaded application images 910. In addition, the application metadata copies 430 are reloaded 635 to the writable memory 215 as reloaded application metadata 905. In one embodiment, the user metadata copy 435 is also reloaded 730 to the writable memory 215.

The depicted embodiments rapidly and efficiently identify 630 application images 410 that were residing in writable memory 215 and reload 635 the application images 410 to the writable memory 215, supporting a rapid and automated recovery from an operational anomaly.

Embodiments of the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a tangible memory device storing a computer readable program;
   a processor executing the computer readable program, the computer readable program comprising
      a copy module copying application metadata, for an application image, to an application metadata copy on a remote server and copying user metadata, that indexes user data stored on a removable storage device, to a user metadata copy on the remote server, wherein the application metadata copy comprises a Universal Resource Locator (URL) for an application image copy stored on the remote server and information for licensing the application image, and wherein the user metadata, the application metadata, and the application image are stored on a writable memory of a data processing device, the application image and the user data are not copied to the remote server, and the remote server is in communication with the data processing device over a network;
      a detection module detecting an operational anomaly;
      an erasure module erasing all images on the writeable memory in response to detecting the operational anomaly;
      an identification module identifying the application image from the application metadata copy; and
      a reload module reloading the application image from the application image copy to the writable memory using the URL, relicensing the application image using the information of the application metadata copy, and reloading the user metadata to the writeable memory from the user metadata copy on the remote server.

2. The apparatus of claim 1, further comprising an index module storing the application image on the writable memory and indexing the application image with the application metadata.

3. The apparatus of claim 1, wherein the removable storage device stores all user data.

4. The apparatus of claim 1, wherein the writable memory is a writeable flash memory.

5. A computer readable storage medium comprising a computer readable program stored on a tangible memory device, wherein the computer readable program when executed by a processor reloads images by the operations of:
   copying application metadata, for an application image, to an application metadata copy on a remote server and copying user metadata, that indexes user data stored on a removable storage device, to a user metadata copy on the remote server, wherein the application metadata copy comprises a Universal Resource Locator (URL) for the application image copy stored on the remote server and information for licensing the application image, and wherein the user metadata, the application metadata, and the application image are stored on a writable memory of a data processing device, the application image and the user data are not copied to the remote server, and the remote server is in communication with the data processing device over a network;

detecting an operational anomaly;

erasing all images on the writeable memory in response to detecting the operational anomaly;

identifying the application image from the application metadata copy; and reloading the application image from the application image copy to the writable memory using the URL, relicensing the application image using the information of the application metadata copy, and reloading the user metadata to the writeable memory from the user metadata copy on the remote server.

6. The computer readable storage medium of claim 5, the operations further comprising storing the application image on the writable memory and indexing the application image with the application metadata.

7. The computer readable storage medium of claim 5, wherein the removable storage device stores all user data.

8. A method comprising:

copying, by use of a processor, application metadata, for an application image, to an application metadata copy on a remote server and copying user metadata, that indexes user data stored on a removable storage device, to a user metadata copy on the remote server, wherein the application metadata copy comprises a Universal Resource Locator (URL) for an application image copy stored the remote server and information for licensing the application image, and wherein the user metadata, the application metadata, and the application image are stored on a writable memory of a data processing device, the application image and the user data are not copied to the remote server, and the remote server is in communication with the data processing device over a network;

detecting an operational anomaly;

erasing all images on the writeable memory in response to detecting the operational anomaly;

identifying the application image from the application metadata copy; and reloading the application image from the application image copy to the writable memory using the URL, relicensing the application image using the information of the application metadata copy, and reloading the user metadata to the writeable memory from the user metadata copy on the remote server.

9. The method of claim 8, the method further comprising:

storing the application image on the writable memory and indexing the application image with the application metadata;

storing all user data on a removable storage device; and reloading the user metadata to the writable memory from the user metadata copy in response to detecting the operational anomaly.

* * * * *